United States Patent
Arumugam Maharaja et al.

(10) Patent No.: US 12,052,261 B2
(45) Date of Patent: Jul. 30, 2024

(54) SYSTEM AND METHOD FOR AUTHENTICATING THE RECEIVING END OF DATA TRANSMISSION VIA LiFi AND HOLOCHAIN NETWORK

(71) Applicant: Bank of America Corporation, Charlotte, NC (US)

(72) Inventors: Raja Arumugam Maharaja, Chennai (IN); Ankit Singh Negi, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 293 days.

(21) Appl. No.: 17/672,093

(22) Filed: Feb. 15, 2022

(65) Prior Publication Data

US 2023/0262066 A1 Aug. 17, 2023

(51) Int. Cl.
*H04L 9/40* (2022.01)
*G06F 21/62* (2013.01)

(52) U.S. Cl.
CPC ........ *H04L 63/105* (2013.01); *G06F 21/6245* (2013.01); *H04L 63/0428* (2013.01)

(58) Field of Classification Search
CPC ............... H04L 63/105; H04L 63/0428; G06F 21/6245; G06F 2221/2141; G06F 21/64; G06F 16/93; G06F 21/31; G06F 21/62; H04W 12/02
See application file for complete search history.

(56) References Cited

U.S. PATENT DOCUMENTS

| | | | |
|---|---|---|---|
| 7,437,023 | B2 | 10/2008 | King et al. |
| 7,496,404 | B2 | 2/2009 | Meadows et al. |
| 8,073,839 | B2 | 12/2011 | Rathod |
| 8,078,688 | B2 | 12/2011 | Ansari et al. |
| 8,260,999 | B2 | 9/2012 | Ganesh et al. |
| 8,271,415 | B2 | 9/2012 | Iliff |
| 8,352,049 | B2 | 1/2013 | Hsiung et al. |
| 8,370,362 | B2 | 2/2013 | Szabo |
| 8,498,941 | B2 | 7/2013 | Felsher |
| 8,560,366 | B2 | 10/2013 | Mikurak |

(Continued)

OTHER PUBLICATIONS

Kashyap et al., "Light Fidelity based Vehicular Access System," 2020 5th International Conference on Communication and Electronics Systems (ICCES) Year: 2020 | Conference Paper | Publisher: IEEE.*

(Continued)

*Primary Examiner* — Roderick Tolentino

(57) ABSTRACT

An authentication system includes a light fidelity (LiFi) device and a receiving device. The LiFi device includes at least one light source that is configured to emit light. The LiFi device communicates encrypted data via the light emitted from the at least one light source to the receiving device. The receiving device receives the encrypted data and obtains the confidential data from the encrypted data. The receiving device accesses an authentication level of the user that indicates to which one or more portions of the confidential data the user is authorized to access. The receiving device determines that the user of the receiving device is authorized to access a first subset of the confidential data based on the authentication level of the user. The receiving device grants, the user of the receiving device, access to the first subset of the confidential data.

20 Claims, 5 Drawing Sheets

(56) References Cited

U.S. PATENT DOCUMENTS

| | | |
|---|---|---|
| 8,566,115 B2 | 10/2013 | Moore |
| 8,597,189 B2 | 12/2013 | Say et al. |
| 8,682,350 B2 | 3/2014 | Altman et al. |
| 8,718,797 B1 | 5/2014 | Addepalli et al. |
| 8,904,181 B1 | 12/2014 | Felsher et al. |
| 9,081,781 B2 | 7/2015 | Khedouri et al. |
| 9,084,776 B2 | 7/2015 | Korman et al. |
| 9,123,058 B2 | 9/2015 | Ricci |
| 9,154,252 B2 | 10/2015 | Cronie et al. |
| 9,171,008 B2 | 10/2015 | Prahlad et al. |
| 9,204,796 B2 | 12/2015 | Tran |
| 9,210,100 B2 | 12/2015 | Van Der Linden et al. |
| 9,239,951 B2 | 1/2016 | Hoffberg et al. |
| 9,424,699 B2 | 8/2016 | Kusens et al. |
| 9,525,486 B2 | 12/2016 | Poola et al. |
| 9,554,447 B2 | 1/2017 | Rains, Jr. et al. |
| 9,643,091 B2 | 5/2017 | Vock et al. |
| 9,734,169 B2 | 8/2017 | Redlich et al. |
| 9,795,453 B2 | 10/2017 | Tierney et al. |
| 9,876,770 B1 * | 1/2018 | Ekambaram ........... H04B 10/85 |
| 9,883,209 B2 | 1/2018 | Ricci |
| 10,002,337 B2 | 6/2018 | Siddique et al. |
| 10,044,229 B2 | 8/2018 | Partovi et al. |
| 10,130,548 B2 | 11/2018 | Lydecker et al. |
| 10,136,292 B2 | 11/2018 | Bosua et al. |
| 10,187,145 B2 | 1/2019 | Tran |
| 10,198,886 B2 | 2/2019 | Kusens et al. |
| 10,279,110 B2 | 5/2019 | Gut et al. |
| 10,521,989 B2 | 12/2019 | Kusens et al. |
| 10,770,436 B2 | 9/2020 | Yeon et al. |
| 10,873,395 B2 | 12/2020 | Mclaurin et al. |
| 11,125,456 B2 | 9/2021 | Tran |
| 2015/0359467 A1 | 12/2015 | Tran |
| 2016/0217327 A1 | 7/2016 | Osterhout et al. |
| 2017/0051884 A1 | 2/2017 | Raring et al. |
| 2017/0258320 A1 | 9/2017 | Abreu |
| 2018/0098220 A1 * | 4/2018 | Frank ..................... H04L 43/16 |
| 2018/0252796 A1 | 9/2018 | Qu et al. |
| 2020/0062848 A1 | 2/2020 | Korman et al. |
| 2020/0137635 A1 | 4/2020 | Feldman et al. |
| 2020/0274971 A1 * | 8/2020 | Nitidharmatut .... G06Q 30/0631 |
| 2020/0334378 A1 * | 10/2020 | Latka .................... H04L 9/3231 |
| 2021/0005072 A1 | 1/2021 | Dinkins |
| 2021/0058242 A1 * | 2/2021 | Donsomsakunkij .. G06F 21/602 |
| 2021/0294173 A1 | 9/2021 | Trikha et al. |
| 2021/0297527 A1 * | 9/2021 | Nitidharmatut ....... H04M 3/247 |
| 2022/0111820 A1 * | 4/2022 | Hassani ................ H04W 12/06 |
| 2022/0232012 A1 * | 7/2022 | Sayed .................. G06F 21/602 |
| 2023/0008892 A1 * | 1/2023 | M M .................... H04W 48/18 |
| 2023/0188344 A1 * | 6/2023 | Nyamwange ......... G06F 3/0605 |
| | | 713/168 |

OTHER PUBLICATIONS

Bokefode et al., "Retrieving Real Time Data Through IOT Devices and Storing Securely on Cloud Using Li-Fi," 2018 3rd International Conference for Convergence in Technology (I2CT) Year: 2018 | Conference Paper | Publisher: IEEE.*

Maharaja, Raja Arumugam, "System and Method for Secured Data Transmission Using LIFI and Holochain Network," U.S. Appl. No. 17/671,973, filed Feb. 15, 2022, 44 pages.

* cited by examiner

SYSTEM AND METHOD FOR AUTHENTICATING THE RECEIVING END OF DATA TRANSMISSION VIA LiFi AND HOLOCHAIN NETWORK

TECHNICAL FIELD

The present disclosure relates generally to network security, and more specifically to a system and method for authenticating the receiving end of data transmission via LiFi and holochain network.

BACKGROUND

As the Internet continues to be utilized by an ever-increasing number of users, fraudulent and criminal activity via the Internet also rises. In data transmission through the Internet, the data is exposed to bad actors and cyberattacks. It is challenging to transmit data through the Internet without exposing the data to bad actors and cyberattacks.

SUMMARY

The system described in the present disclosure is particularly integrated into practical applications of improving data transmission security and network security technologies. This, in turn, provides an additional practical application of data loss prevention. As such, the technology disclosed in the present disclosure improves the underlying operations of network nodes, servers, switches, and routers that communicate data through the network. These practical applications are described below.

Implementing Secured Data Transmission

The present disclosure contemplates systems and methods configured to implement secured data transmission. In an example scenario, assume that a first user generates data that contains confidential information, such as personal information associated with clients of an organization. The disclosed system, at a first device associated with the first user, identifies the confidential data based on historical user indications that indicate which data is confidential and which data is not confidential. The disclosed system encrypts the confidential data.

Also, assume that a second user wants to access and use the confidential data. The second user, via a second device, sends a request to a holochain network, to receive the confidential data. The holochain network comprises a plurality of network nodes. Each network node may store different data compared to other network nodes. For example, a particular network node in the holochain network may store data associated with the second user. The holochain network determines whether the second user is authenticated to receive the confidential data.

In this process, the holochain network identifies the particular network node that stores data associated with the second user and fetches that data. The data associated with the second user may include an authorization level associated with the second user, login credentials associated with the second user, etc.

The holochain network determines that the second user is authorized to access the confidential data based on the authentication level associated with the second user. For example, if the authentication level associated with the second user indicates that the second user is authorized to access data with privacy levels more than or equal to the privacy level of the confidential data, the holochain network determines that the second user is authorized to access the confidential data.

In response to determining that the second user is authorized to access the confidential data, the holochain network sends a message to the first device indicating that the second user has requested to receive the confidential data.

The disclosed system, at the first device, initiates the communication of the encrypted data. The first device (also referred to herein as the sending device) communicates the encrypted data to a light fidelity (LiFi) device.

The LiFi device includes at least one light source, e.g., light-emitting diodes (LEDs) that are configured to emit light. The LiFi device is configured to transmit data through light emitted from the LEDs. The LiFi device transmits the encrypted data via the light emitted from the LEDs to the second device (also referred to herein as the receiving device). The receiving device is operably coupled with a sensor that is configured to capture data (e.g., the encrypted data) from the emitted light.

The disclosed system ensures that the receiving device is not connected to the Internet or the public network. For example, the disclosed system disconnects internet connectivity software and/or hardware module associated with the second device. In this manner, the data is transmitted from the sending device to the receiving device without the Internet or the public network. Thus, the data is not exposed to bad actors who have access to Internet or the public network, and the data is kept secure from cyberattacks. Therefore, the security of the data and the security of the network communication between the sending device and the receiving device are improved. Accordingly, the disclosed system may be integrated into a practical application of improving data transmission security and network security technologies.

Since the data security and network communication security are improved, bad actors cannot gain unauthorized access to the data (that is being transmitted and/or stored at any of the sending and receiving devices). This provides an additional practical application of securing the sending and receiving devices along with network nodes, servers, switches, and routers that communicate the data from unauthorized access.

In one embodiment, a system for secured data communication comprises a sending device and a LiFi device. The sending device comprises a memory and a processor. The memory is configured to store data. The processor is operably coupled to the memory. The processor determines that a first subset of the data is confidential based at least in part upon historical indications that indicate that the first subset of the data is confidential. The processor encrypts the first subset of the data. The processor receives a first message that indicates that a user of a receiving device initiated a request to receive the first subset of the data, where the first message comprises an indication that the user is authorized to receive the first subset of the data. The processor communicates the encrypted data to the LiFi device in response to receiving the first message.

The LiFi device is communicatively coupled to the sending device. The LiFi device comprises at least one light sensor and a second processor. The at least one light source is configured to emit light. The second processor is operably coupled to the at least one light source. The second processor is configured to communicate the encrypted data via the light emitted from the at least one light source to the receiving device.

Authenticating a User at a Receiving End of Data

The present disclosure contemplates systems and methods configured to authenticate a user at the receiving end of data. For example, upon the second device (e.g., the destination device) receiving the encrypted data from the LiFi device (as described above), the disclosed system determines whether the user of the second device is authorized to access each portion of the received data. The disclosed system may implement a filter logic to filter out one or more portions of the received data if it is determined that the user is not authorized to access and/or view the one or more portions of the received data.

In certain embodiment, if the disclosed system determines that the receiver is authorized to access the received data, it will not implement a filter logic. Otherwise, the disclosed system may implement the filter logic to filter out one or more parts of the received data that the receiver is not authorized to access and/or view. For example, the filter logic may include software instructions to implement covering, blocking, locking, and/or redacting one or more parts of the received data that the receiver is not authorized to access and/or view.

Accordingly, the disclosed system improves the security of the received data and prevents unauthorized access to one or more portions of the received data from unauthorized users. Therefore, the disclosed system improves the information security technology.

In one embodiment, an authentication system comprises a LiFi device and a receiving device. The LiFi device comprises at least one light source configured to emit light. The LiFi device further comprises a first processor operably coupled to the at least one light source. The first processor is configured to communicate encrypted data via the light emitted from the at least one light source, where the encrypted data comprises confidential data. The receiving device is communicatively coupled to the LiFi device. The receiving device comprises at least one sensor positioned to capture the encrypted data from the light emitted by the at least one light source, where the at least one sensor is positioned in a direction of the light so that the at least one sensor captures the encrypted data from the light. The receiving device further comprises a second processor operably coupled to the at least one sensor. The second processor communicates a message that comprises a request to access the confidential data. The second processor receives the encrypted data from the at least one sensor. The second processor obtains the confidential data from the encrypted data. The second processor accesses an authentication level associated with a user of the receiving device, where the authentication level associated with the user indicates to which one or more portions of the confidential data the user is authorized to access. The second processor determines that the user of the receiving device is authorized to access a first subset of the confidential data based at least in part upon the authentication level associated with the user. The second processor grants, the user of the receiving device, access to the first subset of the confidential data.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to provide a secured data transmission to protect the data from cyberattacks, and to authenticate a user at a receiving end of the data. Embodiments of the present disclosure and its advantages may be understood by referring to FIGS. 1 through 5. FIGS. 1 through 5 are used to describe systems and methods for implementing a secured data transmission and authenticating a receiving end of the data.

System Overview

Figure 1:
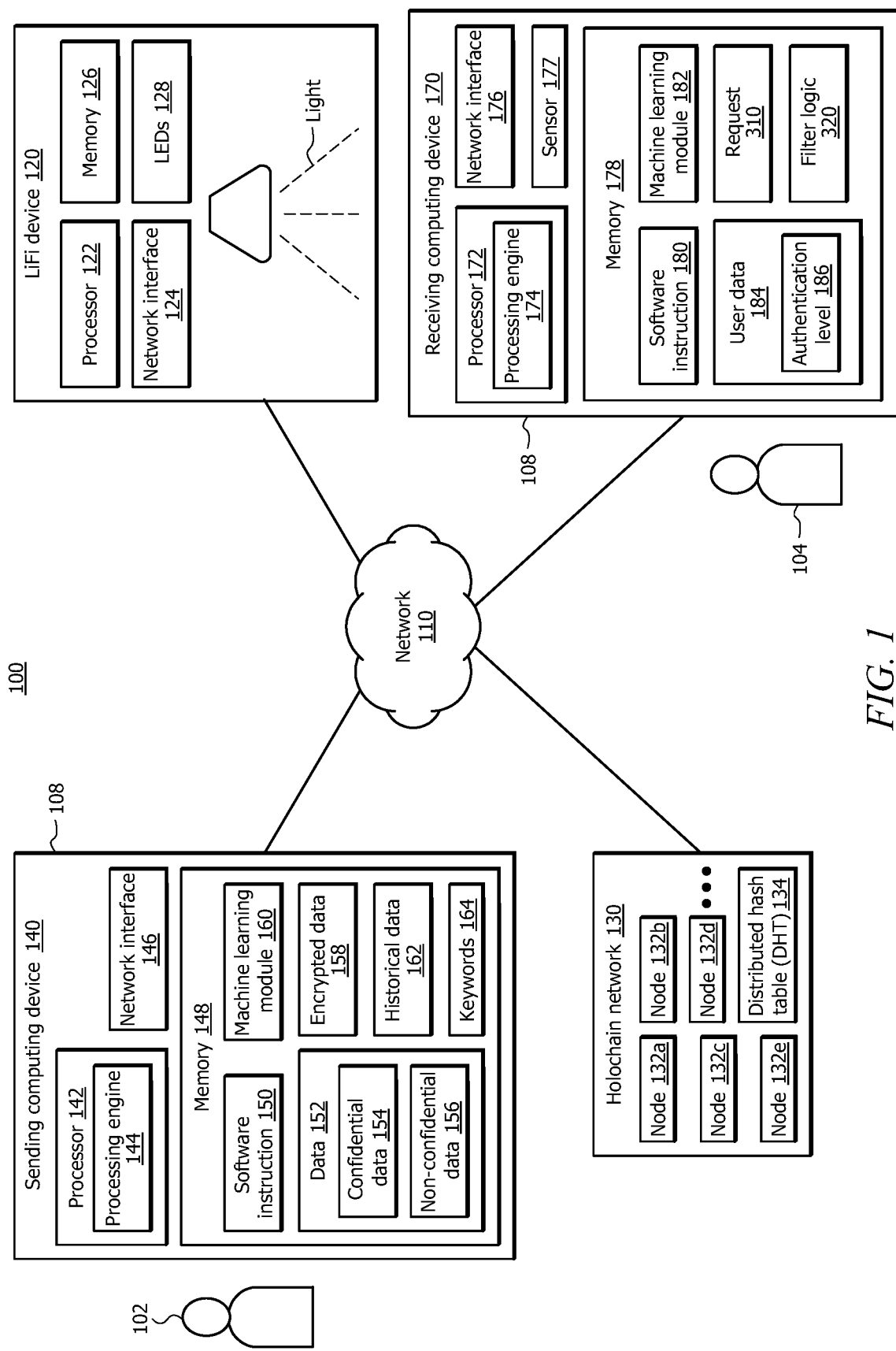
FIG. 1 illustrates an embodiment of a system configured to implement a secured data transmission.

FIG. 1 illustrates an embodiment of a system 100 that is configured to implement secured data transmission and authenticate a user at a receiving end of the data. In one embodiment, the system 100 comprises a sending computing device 140 communicatively coupled to a light fidelity (LiFi) device 120, a holochain network 130, and a receiving computing device 170 via a network 110. Network 110 enables the communication between components of the system 100. The sending computing device 140 (also referred to herein as a sending device 140) comprises a processor 142 in signal communication with a memory 148. Memory 148 stores software instructions 150 that when executed by the processor 142 causes the processor 142 to perform one or more operations of the sending device 140. The receiving computing device 170 (also referred to herein as a receiving device 170) comprises a processor 172 in signal communication with a memory 178. Memory 178 stores software instructions 180 that when executed by the processor 172 causes the processor 172 to perform one or more operations of the receiving device 170. In other embodiments, system 100 may not have all of the components listed and/or may have other elements instead of, or in addition to, those listed above.

In an example scenario, assume that the first user 102 wants to transmit confidential data 154 to the second user 104. One potential approach is to use the Internet or the public network. However, this approach suffers from the lack of information security, data transmission security, and network security. System 100 is configured to implement a secured data transmission from a sending device 140 (associated with the first user 102) to the receiving device 170 (associated with the second user 104) without the Internet or the public network. The data is first encrypted at the sending device 140, transmitted to the LiFi device 120 and then to the receiving device 170. In this manner, the system 100 improves the security of the transmitted data and the network security.

System Components

Network

Network 110 may be any suitable type of wireless and/or wired network. The network 110 is not connected to the Internet or the public network. The network 110 may include all or a portion of a network that is not connected to the Internet or the public network, such as an Intranet, a peer-to-peer network, a personal area network (PAN), a wireless PAN (WPAN), and/or any other suitable network. The network 110 may be configured to support any suitable type of communication protocol.

LiFi Device

LiFi device 120 is generally a device that is configured to transmit data via emitting light. The LiFi device 120 may include a processor 122 in signal communication with a network interface 124, a memory 126, and at least one light source, such as light emitting diodes (LEDs) 128. The LiFi device 120 may be configured to use light emitted from the LEDs 128 as medium to transmit data. The LiFi device 120 is not connected to the Internet or the public network.

The LiFi device 120 is configured to modulate data into the light emitted from the LEDs 128 by the processor 122 executing software instructions stored in memory 126. The processor 122 may use visible light communication (VLC) modulation technique, its variants, and/or other modulation techniques.

Processor 122 comprises one or more processors operably coupled to the memory 126. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers and other components. The one or more processors are configured to implement various instructions. For example, the one or more processors are configured to execute instructions (e.g., software instructions) to implement the operations of the LiFi device 120. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-5.

Network interface 124 is configured to enable wired and/or wireless communications (e.g., via network 110). The network interface 124 is configured to communicate data between the LiFi device 120 and other devices, databases, systems, or domains. For example, the network interface 124 may comprise a WIFI interface, a local area network (LAN) interface, a wide area network (WAN) interface, a modem, a switch, or a router. The processor 122 is configured to send and receive data using the network interface 124. The network interface 124 may be configured to use any suitable type of communication protocol.

Memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 comprises one or more disks, tape drives, or solid-state drives, and may be used as an over-flow data storage device, to store programs when such programs are selected for execution, and to store instructions and data that are read during program execution. The memory 126 may store any of the information described in FIGS. 1-5 along with any other data, instructions, logic, rules, or code operable to implement the function(s) described herein when executed by processor 122. For example, the memory 126 may store software instructions. The software instructions may comprise any suitable set of instructions, logic, rules, or code operable to execute the processor 122 and perform the functions of the LiFi device 120 described herein. Memory 126 may store software instructions, configuration data, and/or operation instructions that when executed by the processor 122, causes the LiFi device 120 to transmit data (e.g., data received from the sending device 140 via the network 110) to the receiving device 170 via light emitted from LEDs 128.

The LEDs 128 are configured to receive and transmit visible light according to a predetermined protocol such as a variant of IEEE 802.15.7 or other VLC protocol. The LEDs 128 include light-emitting elements which transmit modulated data on visible light and light sensing elements that receive modulate data on visible light. In an exemplary embodiment, the LEDs 128 include one or more modulated LED lighting fixtures which are used as transmitters and one or more photo/optical sensors which are used as receivers. In this manner, the LiFi device 120 can work both as a lighting source and as an infrastructure data communications device. The LEDs 128 may be faced in the direction on the receiving device 170. As such, a sensor at the receiving device 170 may receive data being transmitted via the light emitted from the LEDs 128.

Holochain Network

Holochain network 130 comprises a cloud of computer systems 132 (e.g., 132*a-e*) and is generally configured to allow storing and maintaining different data at various computer systems 132. The holochain network 130 is a framework for writing fully distributed peer-to-peer applications. The holochain network 130 is a decentralized system. The computer system 132 is also referred to herein as a network node, a node, or a block. The holochain network 130 may comprise any number of nodes 132. In the illustrated embodiment, holochain network 130 includes the node 132*a* to 132*e*. The holochain network 130 may further include the sending device 140 and receiving device 170. For example, a node 132 in the holochain 130 may be the sending device 140, and another node 132 in the holochain 130 may be the receiving device 170. Each node 132 may comprise a computing device, a virtual machine, and/or the like.

The holochain network 130 may provide control over data entry to each node 132. Each node 132 may store different data compared to other nodes 132. This is unlike a blockchain network where all data is shared and distributed among every block in the blockchain network. Thus, to further secure certain data (e.g., user data), the holochain network 130 allows storing the certain data in a particular node 132.

In the holochain network 130, one node 132 (e.g., a parent or genesis node 132*e* receives and accepts transaction requests. Other nodes 132 may only receive and accept data that they are designated with and can process.

Figure 2:
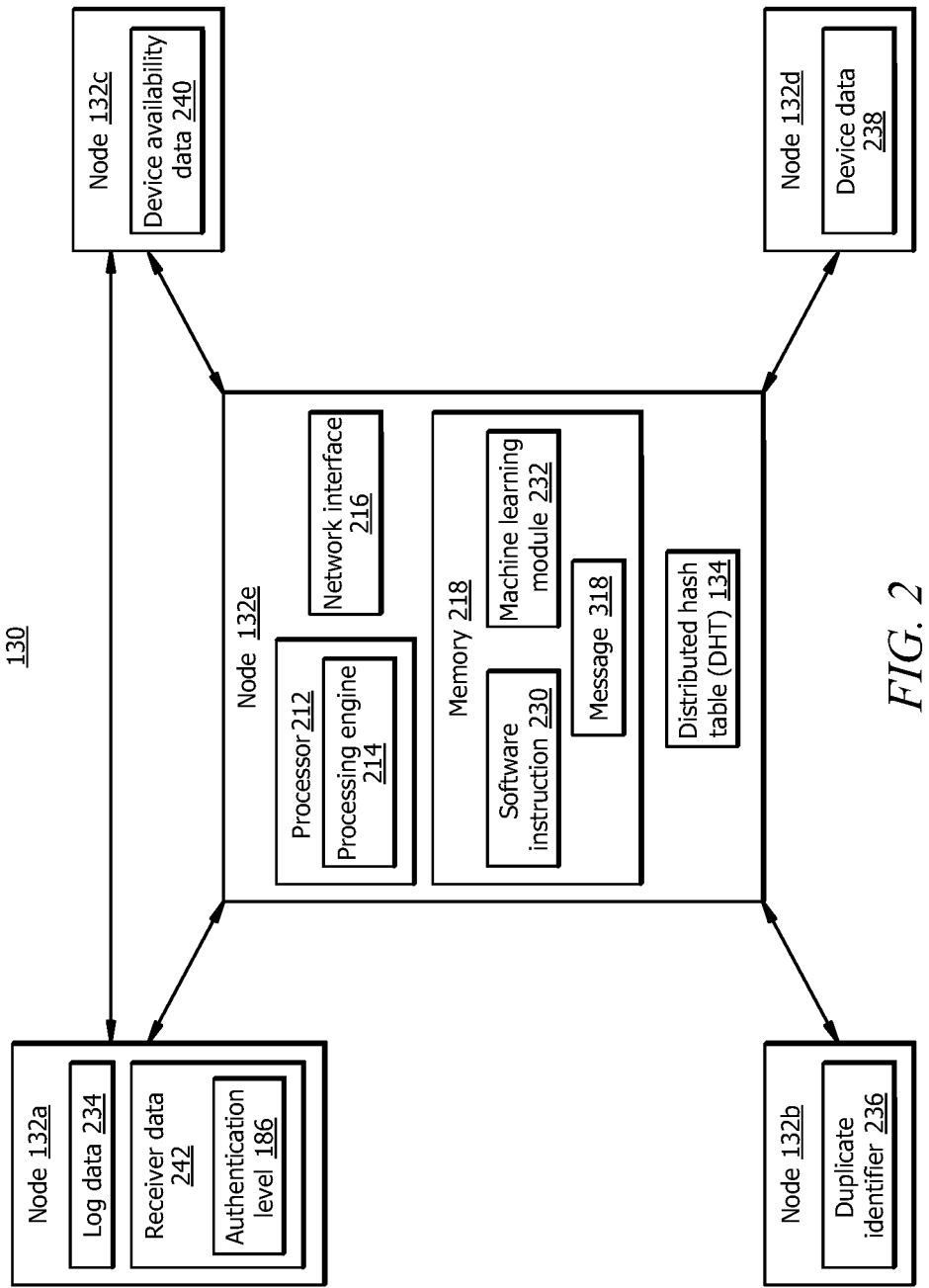
FIG. 2 illustrates an example configuration of a holochain network.

Each 132 may comprise a processor (not explicitly shown in FIG. 1, but a processor of the parent node 132e is shown in FIG. 2) in signal communication with a memory block or storage capacity (not explicitly shown in FIG. 1, but a memory of the parent node 132e is shown in FIG. 2).

The holochain network 130 is a distributed system with content-addressed nodes 132a-e, where identities, nodes, and storage elements are all addressed by cryptographic hash values. Distributed applications may run across multiple nodes 132 in the holochain network 130. The holochain network 130 is organized to provide a decentralized state coordination function so as to protect the integrity and functionality of the distributed, decentralized applications running on the holochain network 130.

In a holochain network 130, each node 132 may include information derived from a preceding node 132. For example, every node 132 in the holochain includes a hash of the previous node 132. By including the hash of the previous node 132, the holochain network 130 includes a chain of node 132 from a genesis node 132e (or a node not shown in the example of FIG. 1) to the latest node 132a (or a node not shown in the example of FIG. 1). Each node 132 is guaranteed to come after the previous node 132 chronologically because the previous block's hash value would otherwise not be known.

The holochain network 130 may comprise a network of nodes 132, each maintaining a unique source chain of its local data, paired with a shared space implemented as a validating, monotonic, sharded, distributed hash table (DHT) 134, where every node 132 enforces validation rule(s) on data in the shared DHT 134 as well as confirms the source of the data according to an associated signature. The shared DHT 134 space allows the coordinating nodes to deterministically identify other nodes 132 that can record and verify the particulars of each state update.

The holochain network 130 is described in more detail in FIG. 2. Referring to FIG. 2, the holochain network 130 includes network nodes 132a to 132e and a DHT 134. Node 132e may be the genesis or parent node that receives and processes incoming transaction requests from other devices, e.g., the receiving device 170. The node 132e includes a processor 212 in signal communication with a memory 218 and a network interface 216. Each of the nodes 132a to 132d, although not explicitly shown may also include a processor 212 in signal communication with a memory 218 and a network interface 216. Memory 218 stores software instructions 230 that when executed by the processor 212, cause the processor 212 to perform one or more operations of the respective node 132.

Processor 212 comprises one or more processors operably coupled to the memory 218. The processor 212 is any electronic circuitry, including, but not limited to, state machines, one or more CPU chips, logic units, cores (e.g., a multi-core processor), FPGAs, ASICs, or DSPs. The processor 212 may be a programmable logic device, a microcontroller, a microprocessor, or any suitable combination of the preceding. The one or more processors are configured to process data and may be implemented in hardware or software. For example, the processor 212 may be 8-bit, 16-bit, 32-bit, 64-bit, or of any other suitable architecture. The processor 212 may include an arithmetic logic unit (ALU) for performing arithmetic and logic operations. The processor 212 may register the supply operands to the ALU and store the results of ALU operations. The processor 212 may further include a control unit that fetches instructions from memory and executes them by directing the coordinated operations of the ALU, registers and other components. The one or more processors are configured to implement various instructions. For example, the one or more processors are configured to execute instructions (e.g., software instructions 230) to implement the processing engine 214 and perform the operations of the respective node 132. In this way, processor 212 may be a special-purpose computer designed to implement the functions disclosed herein. In an embodiment, the processor 212 is implemented using logic units, FPGAs, ASICs, DSPs, or any other suitable hardware. The processor 212 is configured to operate as described in FIGS. 1-5.

Network interface 216 is configured to enable wired and/or wireless communications (e.g., via network 110). The network interface 216 is configured to communicate data between the node 132 and other devices, databases, systems, or domains. For example, the network interface 216 may comprise a WIFI interface, a LAN interface, a WAN interface, a modem, a switch, or a router. The processor 212 is configured to send and receive data using the network interface 216. The network interface 216 may be configured to use any suitable type of communication protocol.

Memory 218 may be volatile or non-volatile and may comprise ROM, RAM, TCAM, DRAM, and SRAM. The memory 218 may include one or more of a local database, cloud database, NAS, etc. The memory 218 comprises one or more disks, tape drives, or solid-state drives, and may be used as an over-flow data storage device, to store programs when such programs are selected for execution, and to store instructions and data that are read during program execution. The memory 218 may store any of the information described in FIGS. 1-5 along with any other data, instructions, logic, rules, or code operable to implement the function(s) described herein when executed by processor 212. For example, the memory 218 may store software instructions 230, machine learning module 232, message 318, and/or any other data/instruction. The software instructions 230 may comprise any suitable set of instructions, logic, rules, or code operable to execute the processor 212 and perform the functions of the node 132 described herein.

The DHT 134 may be a decentralized storage system that provides lookup and storage schemes similar to a hash table, storing key-value pairs. Each node in a DHT 134 is responsible for keys along with the mapped values. Any node 132 can efficiently retrieve the value associated with a given key. Just like in hash tables, values mapped against keys in a DHT 134 can be any arbitrary form of data. In one example, records or data stored at a node 132 and an identifier of that node 132 are stored as one key-value pairs in the DHT 134.

In certain embodiments, the DHT 134 may be implemented by any storage architecture. Examples of the DHT 134 include, but are not limited to, a database, a virtual machine, a network-attached storage cloud, a storage area network, and a storage assembly directly (or indirectly) coupled to one or more components of the holochain network 130 and the system 100. In certain embodiments, the DHT 134 may store information associated with the nodes 132, such as their identifiers, data stored at each node 132, etc. The DHT 134 may include information associated with users 102 and 104. For example, the DHT 134 may include information that indicates that the user 102 is associated with the device 140, user 104 is associated with the device 170, etc.

Each node 132 may communicate with one or more nodes 132. In the illustrated embodiment, node 132a is in communication with the DHT 134 and node 132c (but not with other nodes 132), node 132b is in communication with the DHT 134 (but not with other nodes 132), node 132c is in communication with the DHT 134 and node 132*a* (but not with other nodes 132), and node 132*d* is in communication with DHT 134 (but not with other nodes 132).

In certain embodiments, a node 132 that stores confidential data is not in communication with (e.g., coupled to or interact with) other nodes 132 to protect the confidential data from exposure. In other embodiments, each node 132 may be in communication with any number and combination of other nodes 132.

Each node 132 may store different data compared to other nodes 132. For example, node 132*a* may store log data 234 and receiver data 242, node 132*b* may store duplicate identifier 236, node 132*c* may store device availability data 240, node 132*d* may store device data 238, such as server speed response.

The receiver data 242 may include information associated with the receiver 104, such as an identifier, an authorization level of the receiver 104 to access certain data (e.g., confidential data 154), login credentials, etc. A node 132 may store information associated with the receiving device 170, such as an identifier of the receiving device 170. A node 132 may store information associated with the sender 102, such as an identifier of the sender 102. A node 132 may store information associated with the sending device 140, such as an identifier of the sending device 140.

When a transaction request is received at the holochain 130, the transaction request is processed at the node 132 (e.g., the parent node 132*e*) that stores the DHT 134. The parent node 132*e* communicates with other nodes 132 to identify which node 132 stores the requested data indicated in the transaction request.

In certain embodiments, a first node 132 may not be operably coupled to the DHT 134, but operably coupled to one or more other nodes 132 including a second node 132. In such cases, the second node 132 may inform the parent node 132*e* (e.g., send a message) that the first node 132 stores the requested data indicated in the transaction request.

The holochain network 130 determines that the receiver 104 is authorized to access the confidential data 154 based on the authentication level 186 associated with the receiver 104. For example, if the authentication level 186 associated with the receiver 104 indicates that the receiver 104 is authorized to access data with privacy levels more than or equal to the privacy level of the confidential data 154, the holochain network 130 determines that the receiver 104 is authorized to access the confidential data 154. The privacy level of the confidential data 154 may be provided by the sender 104 to the holochain network 130 to be stored in a node 132 that is designated to store such data associated with the confidential data 154 (e.g., in the log data 234).

Upon identifying which node 132 has the requested data indicated in the transaction request, the DHT 134 establishes a communication with the identified node 132. The processing engine 214 (via the machine learning module 232) sends a request to the identified node 132 to access the requested data. The identified node 132 sends a hash problem to the parent node 132*e*. The parent node 132*e* via the processing engine 214 and machine learning module 232 solves the hash problem in order to connect to the identified node 132 receive the requested data.

Sending Device

Referring back to FIG. 1, sending device 140 is generally a device that is configured to process data and communicate with computing devices, databases, LiFi device 120, holochain network 130, etc., via the network 110. Examples of the sending device 140 may include a personal computer, a desktop computer, a workstation, a server, a laptop, a tablet computer, a mobile phone (such as a smartphone), and the like. The sending device 140 is a stand-alone device that is not connected to the Internet or the public network (or does not have the component to connect to the Internet or the public network). The sending device 140 is generally configured to oversee the operations of the processing engine 144, as described further below in conjunction with the operational flow 300 of system 100 described in FIG. 3 and method 400 described in FIG. 4.

Processor 142 comprises one or more processors operably coupled to the memory 148. The processor 142 is any electronic circuitry, including, but not limited to, state machines, one or more CPU chips, logic units, cores (e.g., a multi-core processor), FPGAs, ASICs, or DSPs. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of method 400 as described in FIG. 4.

Network interface 146 is configured to enable wired and/or wireless communications (e.g., via network 110). The network interface 146 is configured to communicate data between the device 140 and other devices, databases, systems, or domains. For example, the network interface 146 may comprise a WIFI interface, a LAN interface, a WAN interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise ROM, RAM, TCAM, DRAM, and SRAM. The memory 148 may include one or more of a local database, cloud database, NAS, etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-5 along with any other data, instructions, logic, rules, or code operable to implement the function(s) described herein when executed by processor 142. For example, the memory 148 may store software instructions 150, data 152, machine learning module 160, encrypted data 158, historical data 162, keywords 164, and/or other data/instructions. The software instructions 150 may comprise any suitable set of instructions, logic, rules, or code operable to execute the processor 142 and perform the functions of the sending device 140 described herein.

Processing Engine

Processing engine 144 may be implemented by the processor 142 executing the software instructions 150, and is generally configured to perform one or more operations of the sending device 140 described herein. For example, the processing engine 144 may be configured to identify confidential data 154 from among the data 152, generate the encrypted data 158 by encrypting the confidential data 154, and communicate the encrypted data 158 to the LiFi device 120.

In certain embodiments, the processing engine 144 may be implemented by a machine learning module 160. The machine learning module 160 may include a supervised machine learning, semi-supervised machine learning, and/or unsupervised machine learning algorithm. For example, the machine learning module 160 may comprise a support vector machine, neural network, random forest, k-means clustering, natural language processing, etc. In another example, the machine learning module 160 may be implemented by a plurality of neural network (NN) layers, convolutional NN (CNN) layers, Long-Short-Term-Memory (LSTM) layers, Bi-directional LSTM layers, Recurrent NN (RNN) layers, and the like. The operations of the processing engine 144 are described in greater detail in the operational flow 300 of system 100 described in FIG. 3.

Receiving Server

Receiving device 170 is generally a device that is configured to process data and communicate with computing devices, databases, LiFi device 120, holochain network 130, etc., via the network 110. Examples of the receiving device 170 may include a personal computer, a desktop computer, a workstation, a server, a laptop, a tablet computer, a mobile phone (such as a smartphone), and the like. The receiving device 170 may be a device that can be connected to the Internet or the public network but during the operational flow 300 described in FIG. 3, the machine learning module 182 ensures that the receiving device 170 is not connected to the Internet or the public network. This process is described in greater detail in the operational flow 300 described in FIG. 3. The receiving device 170 is generally configured to oversee the operations of the processing engine 174, as described further below in conjunction with the operational flow 300 of system 100 described in FIG. 3 and method 400 described in FIG. 4.

Processor 172 comprises one or more processors operably coupled to the memory 178. The processor 172 is any electronic circuitry, including, but not limited to, state machines, one or more CPU chips, logic units, cores (e.g., a multi-core processor), FPGAs, ASICs, or DSPs. The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations. The processor 172 may register the supply operands to the ALU and store the results of ALU operations. The processor 172 may further include a control unit that fetches instructions from memory and executes them by directing the coordinated operations of the ALU, registers and other components. The one or more processors are configured to implement various instructions. For example, the one or more processors are configured to execute instructions (e.g., software instructions 180) to implement the processing engine 174. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-5. For example, the processor 172 may be configured to perform one or more operations of method 500 as described in FIG. 5.

Network interface 176 is configured to enable wired and/or wireless communications (e.g., via network 110). The network interface 176 is configured to communicate data between the device 170 and other devices, databases, systems, or domains. For example, the network interface 176 may comprise a WIFI interface, a LAN interface, a WAN interface, a modem, a switch, or a router. The processor 172 is configured to send and receive data using the network interface 176. The network interface 176 may be configured to use any suitable type of communication protocol as would be appreciated by one of ordinary skill in the art.

Memory 178 may be volatile or non-volatile and may comprise ROM, RAM, TCAM, DRAM, and SRAM. The memory 178 may include one or more of a local database, cloud database, NAS, etc. The memory 178 comprises one or more disks, tape drives, or solid-state drives, and may be used as an over-flow data storage device, to store programs when such programs are selected for execution, and to store instructions and data that are read during program execution. The memory 178 may store any of the information described in FIGS. 1-5 along with any other data, instructions, logic, rules, or code operable to implement the function(s) described herein when executed by processor 172. For example, the memory 178 may store software instructions 180, machine learning module 182, user data 184, request 310, filter logic 320, and/or other data/instructions. The software instructions 180 may comprise any suitable set of instructions, logic, rules, or code operable to execute the processor 172 and perform the functions of the receiving device 170 described herein.

Sensor 177 is operably coupled with the processor 172, network interface 176, and memory 178. The sensor 177 is configure to capture data transmitted from a light emitted from the LEDs 128 of the LiFi device 120. For example, the sensor 177 may include a LiFi sensor, a VLC sensor, and the like. In certain embodiments, the sensor 177 may be internal with respect to the receiving device 170 and integrated into the receiving device 170. In certain embodiments, the sensor 177 may be external with respect to the receiving device 170 and operably coupled to the receiving device 170 via wired and/or wireless communications.

Processing Engine

Processing engine 174 may be implemented by the processor 172 executing the software instructions 180, and is generally configured to perform one or more operations of the receiving device 170 described herein. For example, the processing engine 174 may be configured implement a filter logic 320 to filter out data from among received data that the receiver 104 is not authorized to access, and make sure that the receiving device 170 is not connected to the Internet or the public network during the data transmission.

In certain embodiments, the processing engine 174 may be implemented by a machine learning module 182. The machine learning module 182 may include a supervised machine learning, semi-supervised machine learning, and/or unsupervised machine learning algorithm. For example, the machine learning module 182 may comprise a support vector machine, neural network, random forest, k-means clustering, natural language processing, etc. In another example, the machine learning module 160 may be implemented by a neural network layers, CNN layers, LSTM layers, Bi-directional LSTM layers, RNN layers, and the like. The operations of the processing engine 174 are described in greater detail in the operational flow 300 of system 100 described in FIG. 3.

In certain embodiments, any number and combination of the LiFi device 120, the holochain network 130, the sending device 140, and the receiving device 170 may be associated with an organization 108.

FIG. 2 illustrates an example holochain network 130. The description of the example holochain network 130 is described in FIG. 1.

Operational Flow for Implementing Secured Data Transmission

Figure 3:
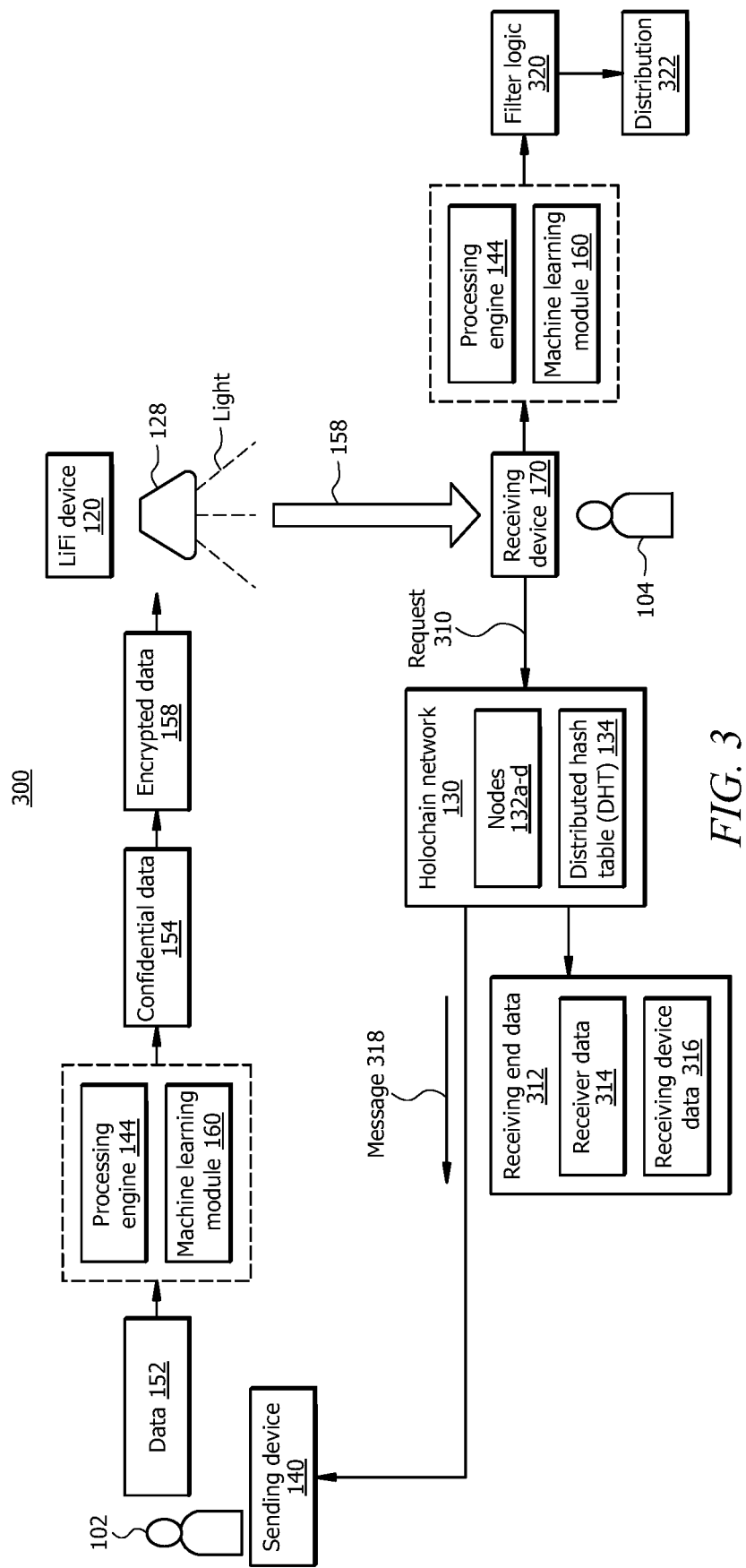
FIG. 3 illustrates an example operational flow of the system of FIG. 1.

FIG. 3 illustrates an example operational flow 300 of the system 100 shown in FIG. 1. The operational flow 300 begins when the sender 102 generates data 152 and stores it in the sending device 140. For example, the data 152 may correspond to the initial data that is generated by a developer. This may be referred to as the initial stage of data creation, sanitization, and the like.

To secure the data 152 from bad actors and cyberattacks, the sending device 140 is not connected to the Internet or the public network. In some cases, other users (e.g., user 104) may want to process or otherwise use the data 152. In certain embodiments, the first user 102 may be a sender of data, and the second user 104 may be a receiver of the data.

Thus, the processing engine 144 may further secure the data 152 by identifying the confidential data in the data 152 and encrypting the confidential data before transmitting to the designated receiver 104. To this end, the processing engine 144 (e.g., via the machine learning module 160) determines whether any part of the data 152 is confidential.

In this process, the processing engine 144 may feed the data 152 to the machine learning module 160 (e.g., a natural language processing module) to identify and/or extract particular keywords 164 known to be (e.g., associated with and/or predefined as) confidential data, such an account numbers, personal user information, private organization information, etc. For example, the machine learning module 160 may be configured to identify a set of particular keywords 164 known to be associated with confidential data.

The processing engine 144 (via the machine learning module 160) may analyze each subset of the data 152. Each subset of the data 152 may include a sentence, a set of words, one word, a set of numbers, one number, a set of symbols, one symbol, or any combination thereof. In this process, the processing engine 144 (via the machine learning module 160) searches, in a first subset of the data 152) for one or more keywords 164 that are known to be associated with confidential information (including those noted above). The processing engine 144 (via the machine learning module 160) may implement word segmentation, sentence segmentation, word tokenization, sentence tokenization, and/or the like to process and analyze each word.

The processing engine 144 (via the machine learning module 160) determines, in the first subset of the data 152, a percentage of words that correspond to the one or more keywords 164. If the processing engine 144 (via the machine learning module 160) determines that the percentage of the words in the first subset of data 152 exceeds a threshold percentage (e.g., 80%, 85%, etc.), the processing engine 144 determines that the first subset of data 152 includes confidential data 154. Similarly, if the processing engine 144 determines that any particular subset of the data 152 includes such confidential data, it determines that the particular subset of data 152 is confidential data 154.

Further, in this process, the processing engine 144 may use historical user indications (i.e., historical data 162). For example, during the training of the machine learning module 160, the sender 102 may manually label a first subset of the data 152 as confidential, and label a second subset of the data 152 as non-confidential. The machine learning module 160 uses this historical user indications/data 162 as a training dataset to automatically identify the confidential data 154 and non-confidential data 156 from among the future data 152. The processing engine 144 determines that a first subset of the data 152 is confidential data 154 based on the historical indications/data 162 that indicates the first subset of data 152 is confidential.

In certain embodiments, the first device 140 may be a sending device, and the second device 170 may be a receiving device. In certain embodiments, the first user 102 may be a receive of data, and the second user 104 may be a sender of the data. In certain embodiments, the first device 140 may be a receiving device, and the second device 170 may be a sending device.

Encrypting the Confidential Data

The processing engine 144 (e.g., via the machine learning module 160) generates encrypted data 158 by encrypting the confidential data 154. In this process, the processing engine 144 may implement any encryption function, hash function, and the like. In certain embodiments, the encryption methods is associated with the confidential data 154. For example, the encryption method may include a mathematical problem related to the confidential data 154, a set of questions related to the confidential data 154, a set of questions related to a structure associated with the confidential data 154, and/or any other encryption methods. In certain embodiments, the encryption method may be irrespective of the recipient of the confidential data 154.

The transmission of the encrypted data 158 may begin in response to the sending device 140 receiving a request to initiate the transmission from receiver 104, where the request is originated from the receiving device 170.

Receiving a Request to Initiate the Data Transmission

Assume that the receiver 104 wants to work on the confidential data 154. However, to protect the confidential data 154 from bad actors via the Internet and cyberattacks, it is not desired to communicate the confidential data 154 via the Internet or the public network. Thus, to protect the confidential data 154 from bad actors, system 100 is configured to implement a secured data transmission of the confidential data 154 without the internet.

In an example scenario, to receive the confidential data 154, the receiver 104 sends a transaction request (e.g., a message) 310 to receive the confidential data 154 to the holochain network 130. The transaction request 310 may include the request to receive the confidential data 154 and information associated with the receiver 104 and the receiving device 70, such as an identifier of the receiver 104 (e.g., login credentials used to login to the receiving device 170), and an identifier of the receiving device 170.

Upon receiving the transaction request 310, the holochain network 130 (e.g., via the parent node 132e) identifies the receiving end data 312 associated with the receiver 104 and the receiving device 170 from the transaction request 310. The receiving end data 312 may include receiver data 314 and receiving device data 316. The receiving end data 312 may include an identifier of the receiver 104 (e.g., login credentials used to login to the receiving device 170), transmission speed, real time device response, data counts, and device efficiency (e.g., CPU and/or memory utilization percentages). Some or all of such receiving end data 312 may be previously stored in a node 132.

The holochain network 130 (e.g., via the parent node 132*e*) transmits the transaction request 310 to the DHT 134. The holochain network 130 determines whether the receiver 104 is authorized to access the confidential data 154. In this process, the holochain network 130 (e.g., via the parent node 132*e*) communicates to (e.g., queries) one or more other nodes 132 to determine whether they store information associated with the receiver 104.

For example, assume that the node 132*a* stores receiver data 242 associated with the receiver 104, such as an identifier, a login credential, historical data (e.g., whether the receiver has breached confidentiality of data, data previously accessed by the receiver 104, etc.), authorization levels to access different levels of confidential data, etc.

In certain embodiments, the DHT 134 may include a record that indicates that the node 132*b* stores the receiver data 242. Thus, upon determining the receiver data 314 from the transaction request 310, the holochain network 130 (e.g., via the parent node 132*e*) searches the DHT 134 to identify which node 132 stores information associated with the receiver 104 and determines that the node 132*b* stores the receiver data 242.

The holochain network 130 (e.g., via the parent node 132*e*) compares the receiver data 314 with the receiver data 242 and determines whether they correspond or match each other. For example, if it is determined that the login credential of the receiver 104 in the receiver data 314 matches the login credentials in the receiver data 242, holochain network 130 (e.g., via the parent node 132*e*) determines that the receiver 104 is verified. In another example, if it is determined that the authentication level 186 of the receiver 104 in the receiver data 242 indicates that the receiver 104 is authorized to access the requested data (e.g., the confidential data 154), holochain network 130 (e.g., via the parent node 132*e*) determines that the receiver 104 is authorized to access the confidential data 154.

Upon authenticating the receiver 104, the holochain network 130 sends a message 318 to the sending device 140 that indicates that the receiver 104 has requested to receive the confidential data 154. The message 318 may include an indication that the receiver 104 is authorized to receive and/or access the confidential data 154 (i.e., the first subset of data 152), an identifier of the receiver 104, an identifier of the receiving device 170, and an identifier of a task associated with the confidential data 154 that the receiver 104 wants to perform.

In certain embodiments, in response to receiving the message 318, the sender 102 may initiate the transmission of the confidential data 154. In certain embodiments, after the training stage of the machine learning module 160, in response to receiving the message 318, the processing engine 144 may automatically initiate the transmission of the confidential data 154.

The processing engine 144 communicates the confidential data 154 to the LiFi device 120, e.g., via wired and/or wireless communication which is not connected to the Internet or the public network. The LiFi device 120 (e.g., by the processor 122 executing the software instructions stored in the memory 126) modulates the encrypted data 158 into the light of the LEDs 128. In this process, the processor 122 may use any modulation technique that can be used in LiFi technology.

Receiving the Encrypted Data from the LiFi Device

In one embodiment, the LEDs 128 of the LiFi device 120 may be switched on by a node 132 (e.g., the parent node 132*e*) in the holochain network 130 in response to the sending device 140 communicating the encrypted data 158 to the LiFi device 120. In another embodiment, the LEDs 128 of the LiFi device 120 may be switched on by a node 132 (e.g., the parent node 132*e*) in the holochain network 130 in response to the sending device 140 sending an acknowledgment message to the holochain network 130 that the transmission request is accepted.

The LiFi device 120 receives the encrypted data 158 and implements software instructions stored in the memory 126 to transmit the encrypted data 158 via light emitted from the LEDs 128. The receiving device 170 (and/or the sensor 177) is placed in the direction of the light emitted from the LEDs 128.

The receiving device 170 (via the sensor 177) captures the encrypted data 158 from the light emitted from the LEDs 128. The receiving device 170 (via the processing engine 174) analyzes the encrypted data 158. The encrypted data 158 may be accompanied by a machine learning module (e.g., machine learning module 160). This machine learning module is used for authenticating the receiver 104.

In certain embodiments, the receiver 104 may decrypt the encrypted data 158, e.g., by answering questions used in the encryption method used to decrypt the confidential data 154, solving a mathematical problem used in the encryption method, among others.

In certain embodiments, the processing engine 174 (e.g., via the machine learning module 182) may decrypt the encrypted data 158 in response to verifying that the receiver 104 is authenticated to access the confidential data 154 using the receiver data 314 and/or receiver data 242.

Upon verifying the receiver 104, the processing engine 174 (e.g., via the machine learning module 182) determines whether the receiver 104 is authorized to access the confidential data 154 based on the authentication level 186 of the receiver 104 to access the confidential data 154 which is stored in the user data 184.

If the processing engine 174 determines that the receiver 104 is authorized to access the confidential data 154, it will not implement a filter logic 320. Otherwise, the processing engine 174 implements the filter logic 320 to filter out one or more parts of the confidential data 154 that the receiver 104 is not authorized to access/view. For example, the filter logic 320 may include software instructions to implement covering, blocking, locking, and/or redacting one or more parts of the confidential data 154 that the receiver 104 is not authorized to access/view.

The processing engine 174 is configured to make sure that the receiving device 170 is not connected to the Internet or the public network. For example, the processing engine 174 may determine if a data packet is sent or received to or from the receiving device 170 (other than the encrypted data 158), the processing engine 174 determines that the receiving device 170 is connected to the Internet. Otherwise, the processing engine 174 may determine that the receiving device 170 is not connected to the Internet. The processing engine 174 may check the internet connectivity software and hardware modules, and disconnect them.

Once the transmission of the encrypted data 158 is complete, the receiving device 170 sends a message to the holochain network 130 that indicates that the data transmission is complete. The holochain network 130 (e.g., via the parent node 132) switches off the LiFi device 120 in response to the holochain network 130 receiving the message indicating that the transmission is complete from the receiving device 170.

The holochain network 130 (e.g., via the parent node 132) sends a message to the sending device 140 that the transmission is complete. The sending device 140 receives the message from the holochain network 130 (e.g., via the parent node 132e) that indicates that the confidential data 154 is received at the receiving device 170. In response, the sending device 140 and/or the sender 102 discontinues the communication of the confidential data 154 to the LiFi device 120.

At distribution stage 322, various parts of the encrypted data 158 that are intended for particular users are distributed to their respective particular users.

Example Method for Implementing Secured Data Transmission

Figure 4:
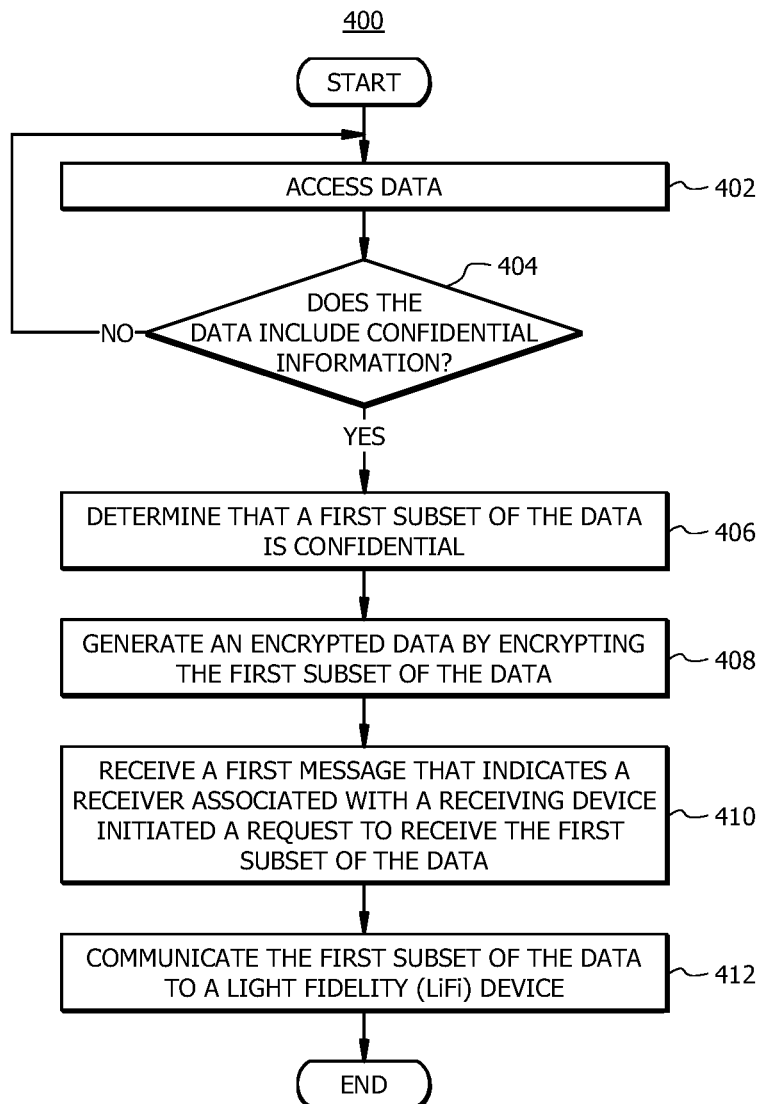
FIG. 4 illustrates an example flowchart of a method for implementing a secured data transmission.

FIG. 4 illustrates an example flowchart of a method 400 for implementing secured data transmission. Modifications, additions, or omissions may be made to method 400. Method 400 may include more, fewer, or other operations. For example, operations may be performed in parallel or in any suitable order. While at times discussed as the system 100, sending device 140, LiFi device 120, or components of any of thereof performing operations, any suitable system or components of the system may perform one or more operations of the method 400. For example, one or more operations of method 400 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 402-412.

At 402, the processing engine 144 accesses data 152. The data 152 is generated by the user 102 and stored in the memory 148.

At 404, the processing engine 144 determines whether the data 152 includes confidential information. For example, the processing engine 144 may feed the data 152 to the machine learning module 160 and determine whether the data 152 includes one or more particular keywords that are known to be associated with confidential information, similar to that described in FIG. 2. If the processing engine 144 determines that the data 152 includes confidential information (e.g., confidential data 154), method 400 proceeds to 406. Otherwise, method 400 returns to 402.

At 406, the processing engine 144 determines that a first subset of the data 152 is confidential. The first subset of data 152 may correspond to the confidential data 154. For example, the processing engine 144 may determine that first subset of the data 152 is confidential because it includes one or more of the particular keywords that are known to be associated with the confidential information.

At 408, the processing engine 144 generates an encrypted data 158 by encrypting the first subset of data 152. In this process, the processing engine 144 may implement a machine learning module 160 that may include an encryption function, a hash function, and the like, similar to that described in FIG. 2.

At 410, the processing engine 144 receives a first message 318 that indicates that a receiver 104 associated with a receiving device 170 has initiated a request to receive the first subset of the data 152. The processing engine 144 may receive the first message 318 from a node 132 (e.g., the parent node 132) in the holochain network 130. The first message 318 may include an indication that the receiver 104 is authorized to receive and/or access the confidential data 154 (i.e., the first subset of data 152), an identifier of the receiver 104, an identifier of the receiving device 170, and an identifier of a task associated with the confidential data 154 that the receiver 104 wants to perform. The processing engine 144 determines that the receiver 104 is authorized to access the confidential data 154 based on the message 318.

At 412, the processing engine 144 communicates the first subset of the data 152 to the LiFi device 120. For example, the processing engine 144 may communicate the first subset of the data 152 to the LiFi device 120 via the network 110.

Example Method for Authenticating a User at a Receiving End of Data

Figure 5:
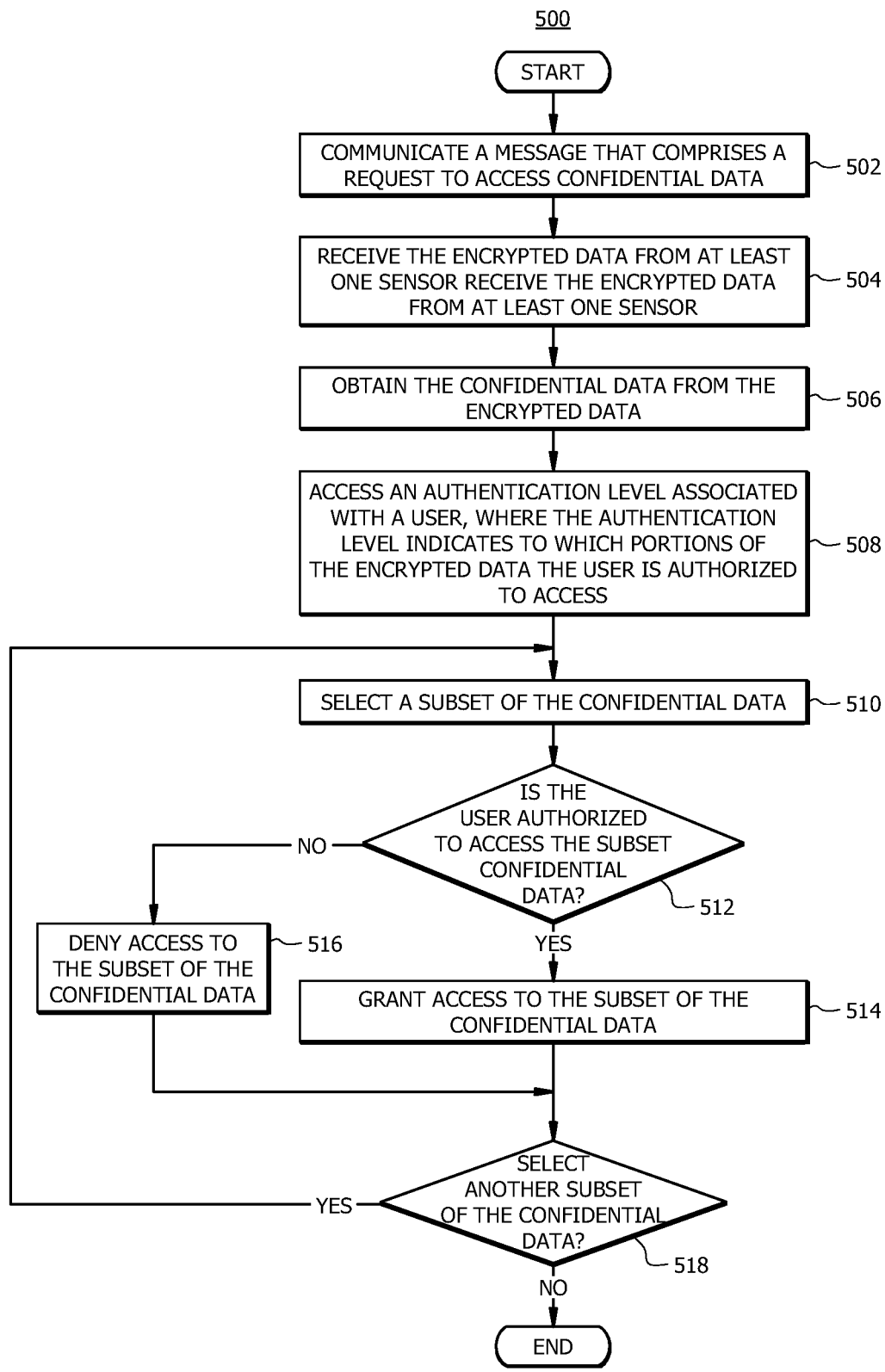
FIG. 5 illustrates an example flowchart of a method for authenticating a user that a receiving end of data.

FIG. 5 illustrates an example flowchart of a method 500 for authenticating a user at the receiving end of data. Modifications, additions, or omissions may be made to method 500. Method 500 may include more, fewer, or other operations. For example, operations may be performed in parallel or in any suitable order. While at times discussed as the system 100, receiving device 170, LiFi device 120, or components of any of thereof performing operations, any suitable system or components of the system may perform one or more operations of the method 500. For example, one or more operations of method 500 may be implemented, at least in part, in the form of software instructions 180 of FIG. 1, stored on non-transitory, tangible, machine-readable media (e.g., memory 178 of FIG. 1) that when run by one or more processors (e.g., processor 172 of FIG. 1) may cause the one or more processors to perform operations 502-518.

At 502, the processing engine 174 communicates a request message 310 that comprises a request to access confidential data 154. In this process, the processing engine 174 may communicate the request message 310 to the parent node 132e of the holochain network 130, similar to that described in FIGS. 2 and 3. The parent node 132e may send a message 318 to the sending device 140, where the message 318 indicates that the user 104 has requested to receive the confidential data 154. The message 310 and/or message 318 may further comprise an identifier of the user 104, an identifier of the receiving device 170, and an identifier of a task associated with the confidential data 154.

At 504, the processing engine 174 receives the encrypted data 158 from the at least one sensor 177. For example, the at least one sensor 177 is positioned in the direction of the light emitted from the light sources (e.g., LEDs 128) of the LiFi device 120, and captures the encrypted data 158 from the at least one sensor 177. In this process, the processing engine 174 and/or the sensors 177 may demodulate the emitted light to extract the encrypted data 158 from the light, using VLC protocol demodulation techniques, its variants, and/or any other suitable demodulation technique. In certain embodiments, the processing engine 174 disconnects internet connectivity software and hardware modules at the receiving device 170 while the encrypted data 158 is being received from the LiFi device 120.

At 506, the processing engine 174 obtains the confidential data 154 from the encrypted data 158. For example, the user 104 may decrypt the encrypted data 158, e.g., by answering questions used in the encryption method used to decrypt the confidential data 154, solving a mathematical problem used in the encryption method, among others, similar to that described in FIGS. 2 and 3.

In certain embodiments, the processing engine 174 may obtain the confidential data 154 when the user 104 decrypts the encrypted data 158, similar to that described in FIGS. 2 and 3. In certain embodiments, the processing engine 174 may obtain the confidential data 154 when the processing engine 174 (e.g., via the machine learning module 182) decrypts the encrypted data 158, similar to that described in FIGS. 2 and 3.

In certain embodiments, even if the user 104 decrypts the encrypted data 158, the confidential data 154 may not be accessible to the user 104 and/or cannot be viewed by the user 104. For example the confidential data 154 may not be accessible to the user 104 and/or cannot be viewed by the user 104 until it is determined that the user 104 is authorized to access and view all portions of the confidential data 154. The confidential data 154 may not be accessible to the user 104 and/or cannot be viewed by the user 104 such that the confidential data 154 is locked, blocked, or otherwise inaccessible by the processing engine 174.

At 508, the processing engine 174 accesses the authentication level 186 associated with the user 104, where the authentication level 186 indicates to which portion(s) of the confidential data 154 the user 104 is authorized to access. For example, the processing engine 174 may access the authentication level 186 stored in the user data 184 stored in memory 178. In another example, the processing engine 174 may access the authentication level 186 that is stored in the receiver data 242 in a memory of the node 132a, similar to that described in FIGS. 2 and 3.

At 510, the processing engine 174 selects a subset of the confidential data 154. Each subset of the confidential data 154 may include a sentence, one or more words, one or more numbers, one or more symbols, or any combination thereof. The processing engine 174 may iteratively select a subset of the confidential data 154 until no subset of the confidential data 154 is left for evaluation.

At 512, the processing engine 214 determines whether the user 104 is authorized to access the subset of the confidential data 154 (based on the authentication level 186 of the user 104). If the processing engine 214 determines that the user 104 is authorized to access the subset of the confidential data 154, method 500 proceeds to 514. Otherwise, method 500 proceeds to 516.

At 514, the processing engine 174 grants access to the subset of confidential data 154. If the processing engine 174 determines that the user 104 is authorized to access the subset of confidential data 154, it will not implement a filter logic 320. For example, the processing engine 174 allows the user 104 to access and view the subset of confidential data 154, similar to that described in FIGS. 2 and 3.

At 516, the processing engine 174 denies access to the subset of confidential data 154. For example, the processing engine 174 implements the filter logic 320 to filter out the subset of the confidential data 154 that the user 104 is not authorized to access/view. For example, the filter logic 320 may include software instructions to implement covering, blocking, locking, and/or redacting one or more parts of the confidential data 154 that the user 104 is not authorized to access/view, similar to that described in FIGS. 2 and 3.

At 518, the processing engine 174 determines whether to select another subset of the confidential data 154. If the processing engine 174 determines that at least one subset of the confidential data 154 is left for evaluation, method 500 returns to 510. Otherwise, method 500 is terminated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An authentication system, comprising:
 a light fidelity (LiFi) device comprising:
  at least one light source configured to emit light; and
  a first processor operably coupled to the at least one light source, and configured to communicate encrypted data via the light emitted from the at least one light source, wherein the encrypted data comprises confidential data; and
 a receiving device communicatively coupled to the LiFi device, and comprising:
  at least one sensor positioned to capture the encrypted data from the light emitted by the at least one light source, wherein the at least one sensor is positioned in a direction of the light so that the at least one sensor captures the encrypted data from the light; and
  a second processor operably coupled to the at least one sensor, and configured to:
   communicate a request to a holochain network to access the confidential data stored in a sending device,
    wherein the request includes a first receiver data associated with the receiving device;
    wherein the second processor is further configured to receive the encrypted data based on the holochain network determining that a user of the receiving device is authorized to access the confidential data by comparing an authentication level of the user included in the first receiver data with an authentication level of the user stored in the holochain network; and
    wherein the authentication level associated with the user indicates to which one or more portions of the confidential data the user is authorized to access;
   determine that the user of the receiving device is authorized to access a first subset of the confidential data based at least in part upon the authentication level associated with the user;
   receive the encrypted data using the at least one sensor, wherein the at least one light source of the LiFi device is switched on by the holochain network in response to the sending device communicating the encrypted data to the LiFi device;
   obtain the confidential data from the encrypted data; and
   grant the user of the receiving device access to the first subset of the confidential data.

2. The authentication system of claim 1, wherein:
the request is communicated from the receiving device to a network node associated with the holochain network;
the holochain network is communicatively coupled to the LiFi device, the sending device, and the receiving device; and
the holochain network is configured to implement a decentralized peer-to-peer network communication among a plurality of network nodes.

3. The authentication system of claim 2, wherein the network node comprises a third processor configured to communicate the request to the sending device that encrypts the confidential data.

4. The authentication system of claim 3, wherein the first processor is further configured to receive the encrypted data from the sending device.

5. The authentication system of claim 1, wherein the second processor is further configured to disconnect internet connectivity software modules at the receiving device while the encrypted data is being received from the LiFi device.

6. The authentication system of claim 1, wherein the second processor is further configured to:
determine that the user of the receiving device is not authorized to access a second subset of the confidential data based at least in part upon the authentication level associated with the user; and
deny the user of the receiving device access to the second subset of the confidential data.

7. The authentication system of claim 1, wherein the first receiver data in the request comprises an identifier of the user, an identifier of the receiving device, and an identifier of a task associated with the first subset of the confidential data.

8. A method, comprising:
communicating, by a processor associated with a receiving device, a request to a holochain network to access confidential data stored in a sending device, wherein the request includes a first receiver data associated with the receiving device;
receiving, by the processor, encrypted data based on the holochain network determining that a user of the receiving device is authorized to access the confidential data by comparing an authentication level of the user included in the first receiver data with an authentication level of the user stored in the holochain network, wherein the encrypted data is received from at least one sensor associated with a light fidelity (LiFi) device, wherein:
the at least one sensor is positioned to capture the encrypted data from light emitted by at least one light source of the light fidelity (LiFi) device;
the at least one sensor is positioned in a direction of the light so that the at least one sensor captures the encrypted data from the light;
the at least one light source is configured to communicate the encrypted data via the light emitted from the at least one light source;
the encrypted data comprises the confidential data; and
the authentication level associated with the user indicates to which one or more portions of the confidential data the user is authorized to access;
determining, by the processor, that the user of the receiving device is authorized to access a first subset of the confidential data based at least in part upon the authentication level associated with the user;
receiving, by the processor, the encrypted data using the at least one sensor, wherein the at least one light source of the LiFi device is switched on by the holochain network in response to the sending device communicating the encrypted data to the LiFi device;
obtaining, by the processor, the confidential data from the encrypted data; and
granting, by the processor, the user of the receiving device access to the first subset of the confidential data.

9. The method of claim 8, wherein:
the request is communicated from the receiving device to a network node associated with the holochain network;
the holochain network is communicatively coupled to the LiFi device, the sending device, and the receiving device; and
the holochain network is configured to implement a decentralized peer-to-peer network communication among a plurality of network nodes.

10. The method of claim 9, wherein the request is communicated to the sending device that encrypts the confidential data.

11. The method of claim 10, wherein the LiFi device receives the encrypted data from the sending device.

12. The method of claim 8, further comprising disconnecting, by the processor, internet connectivity software modules at the receiving device while the encrypted data is being received from the LiFi device.

13. The method of claim 8, further comprising:
determining, by the processor, that the user of the receiving device is not authorized to access a second subset of the confidential data based at least in part upon the authentication level associated with the user; and
denying, by the processor, the user of the receiving device access to the second subset of the confidential data.

14. The method of claim 8, wherein the first receiver data in the request further comprises an identifier of the user, an identifier of the receiving device, and an identifier of a task associated with the first subset of the confidential data.

15. A non-transitory computer-readable medium storing instructions that when executed by a processor cause the processor to:
communicate a request from a receiving device to a holochain network to access confidential data stored in a sending device, wherein the request includes a first receiver data associated with the receiving device;
receive encrypted data based on the holochain network determining that a user of the receiving device is authorized to access the confidential data by comparing an authentication level of the user included in the first receiver data with an authentication level of the user stored in the holochain network, wherein the encrypted data is received from at least one sensor associated with the receiving device, wherein:
the encrypted data is captured by the at least one sensor;
the at least one sensor is positioned to capture the encrypted data from light emitted by at least one light source associated with a light fidelity (LiFi) device;
the at least one sensor is positioned in a direction of the light so that the at least one sensor captures the encrypted data from the light;
the at least one light source is configured to communicate the encrypted data via the light emitted from the at least one light source;
the encrypted data comprises the confidential data; and
the authentication level associated with the user indicates to which one or more portions of the confidential data the user is authorized to access;

determine that the user of the receiving device is authorized to access a first subset of the confidential data based at least in part upon the authentication level associated with the user;

receive the encrypted data using the at least one sensor, wherein the at least one light source of the LiFi device is switched on by the holochain network in response to the sending device communicating the encrypted data to the LiFi device;

obtain the confidential data from the encrypted data; and grant the user of the receiving device access to the first subset of the confidential data.

16. The non-transitory computer-readable medium of claim 15, wherein:

the request is communicated from the receiving device to a network node associated with the holochain network;

the holochain network is communicatively coupled to the LiFi device, the sending device, and the receiving device; and the holochain network is configured to implement a decentralized peer-to-peer network communication among a plurality of network nodes.

17. The non-transitory computer-readable medium of claim 16, wherein the request is communicated to the sending device that encrypts the confidential data.

18. The non-transitory computer-readable medium of claim 17, wherein the LiFi device receives the encrypted data from the sending device.

19. The non-transitory computer-readable medium of claim 15, wherein the instructions when executed by the processor, further cause the processor to disconnect internet connectivity software modules at the receiving device while the encrypted data is being received from the LiFi device.

20. The non-transitory computer-readable medium of claim 15, wherein the instructions when executed by the processor, further cause the processor to:

determine that the user of the receiving device is not authorized to access a second subset of the confidential data based at least in part upon the authentication level associated with the user; and deny the user of the receiving device access to the second subset of the confidential data.

\* \* \* \* \*